(12) United States Patent
Jiang et al.

(10) Patent No.: US 6,597,452 B1
(45) Date of Patent: Jul. 22, 2003

(54) COMPACT LITTROW-TYPE SCANNING SPECTROMETER

(75) Inventors: Wu Jiang, South Plainfield, NJ (US); Warren Stephen Slutter, Lebanon, NJ (US); Kevin Lange, Raritan, NJ (US)

(73) Assignee: Jobin Yvon, Inc., Edison, NJ (US)

( * ) Notice: Subject to any disclaimer, the term of this patent is extended or adjusted under 35 U.S.C. 154(b) by 62 days.

(21) Appl. No.: 09/716,076

(22) Filed: Nov. 17, 2000

(51) Int. Cl.⁷ .................................................. G01J 3/18
(52) U.S. Cl. ...................................... 356/334; 356/328
(58) Field of Search ................................ 356/328, 301, 356/318, 333, 334, 307, 326; 385/37

(56) References Cited

U.S. PATENT DOCUMENTS

| | | | |
|---|---|---|---|
| 3,069,966 A | * 12/1962 | White | |
| 3,733,131 A | * 5/1973 | Mould | 356/100 |
| 4,310,244 A | * 1/1982 | Perkins et al. | 356/343 |
| 4,387,955 A | 6/1983 | Ludman et al. | |
| 4,605,306 A | 8/1986 | Kaffka et al. | |
| 4,842,353 A | 6/1989 | Thevenon | |
| 4,850,706 A | 7/1989 | Mikes | |
| 4,983,039 A | 1/1991 | Harada et al. | |
| 5,002,393 A | 3/1991 | Thevenon et al. | |
| 5,080,465 A | 1/1992 | Laude | |
| 5,192,981 A | 3/1993 | Slutter et al. | |
| 5,233,405 A | * 8/1993 | Wildnauer et al. | 356/333 |
| 5,285,255 A | * 2/1994 | Baranne | 356/328 |
| 5,371,586 A | 12/1994 | Chau | |
| 5,589,717 A | 12/1996 | Chau | |
| 5,808,765 A | 9/1998 | Laude | |
| 5,835,210 A | * 11/1998 | Ershov | 356/328 |
| 5,838,848 A | 11/1998 | Laude | |
| 5,995,221 A | 11/1999 | Slutter et al. | |
| 6,081,539 A | 6/2000 | Mattori et al. | |
| 6,151,112 A | * 11/2000 | Atkinson et al. | 356/328 |
| 6,263,134 B1 | * 7/2001 | Laude | 385/37 |

* cited by examiner

Primary Examiner—Frank G. Font
Assistant Examiner—Layla Lauchman
(74) Attorney, Agent, or Firm—Handal & Morofsky (57) ABSTRACT

A Littrow-type spectrometer or monochromator using a folded light path to provide a compact optical instrument is disclosed. Light enters the instrument through an inlet aperture on a planar mirror. The aperture is located at the focus of a parabolic collimator mirror. Collimated light reflected by the parabolic mirror is reflected back to the planar mirror, which is positioned at an angle to the collimated light. The light reflected from the planar mirror is directed at a planar grating that produces diffracted light having all the wavelengths input into the system, including light of a selected wavelength, back towards the planar mirror. Light having the selected wavelength is thus caused to fall on the parabolic mirror. The parabolic mirror then focuses the selected wavelength of light onto a light exit aperture that is juxtaposed to the inlet light aperture. The planar grating can be rotatably mounted to scan the input light spectrum.

31 Claims, 4 Drawing Sheets

COMPACT LITTROW-TYPE SCANNING SPECTROMETER

BACKGROUND OF THE INVENTION

1. Field Of The Invention

The present invention relates to diffraction-grating spectrometers and monochromators and, more particularly, to a Littrow-type diffraction grating spectrometer.

2. Background Information

It is known in the art to use various optical modules that are assembled into a desired configuration to perform a specified optical function. Such configuration may take the form of a scientific instrument, or may find employment in a spectroscopy application. Modules that in turn comprise a number of devices for performing optical functions are also known. It is usually advantageous to make each module as compact as possible.

A spectroscope, an instrument which produces a spectrum, is one particularly useful example of such an optical instrument. Another is a spectrograph which is a spectroscope provided with a recording device, or other light-capture means, or the like to receive and record or otherwise process the spectrum generated. A spectrometer is a spectrograph enhanced with means to quantify the output, for example a scale to measure particular wavelengths, or a detector to determine intensity, at one or more wavelengths. The present invention relates particularly to spectrometers, and that term will be used hereinafter. However it will be understood that the novel optics described herein can be employed in spectroscopes or spectrographs for applications where recording, quantification or similar capabilities are not required and the invention extends to such novel spectroscopic and spectrographic applications. To the extent that the invention may be applied to output a single spectral band or to provide a scanned output comprising a series of individual spectral bands, the term "spectrometer" should also be understood to include monochromators.

Diffraction grating spectrographs use one or more diffraction gratings to diffract input light into a spectrum of specific wavelengths or spectral bands. In a typical configuration, spectrographs are designed to select a single wavelength, or a narrow spectral band from the input light, for examination or recordal.

In one known embodiment of spectrometer employing a planar diffraction grating, a concave mirror is illuminated by a point source whose spectrographic composition is to be analyzed. The light from the point source is collimated by the concave mirror to form a parallel bundle of rays, which are caused to fall upon the surface of a planar diffraction grating. This concave mirror is known as a collimator in a typical spectrometer instrument. Because the planar diffraction grating has a number of grooves etched in its surface, light falling on the surface of the diffraction grating is diffracted, that is, reflected an angle which is a function of the wavelength of the light. If the input light source comprises a number of wavelengths, the result is that light of different wavelengths will be diffracted, or reflected, at an angle which is a function of wavelength.

The diffracted light may then be received by a second concave mirror which focuses the diffracted light to form an image of the point source under analysis. However, because light of different wavelengths has been diffracted at different angles, the point source is imaged by the second concave mirror, also known as a focusing mirror, at different points for different wavelengths. Accordingly, it is possible to select out individual wavelengths, or more precisely a narrow region of the spectrum, or spectral band, consisting essentially of a single wavelength, to measure the intensity of the same and to utilize this information, for example for elemental analysis of an emissive source material.

Spectrometric elemental analysis of samples has many industrial uses. For example, in the case of the analysis of industrial slag, such as might be obtained from crucible of molten metal in a steel furnace, the slag may be put into a plasma, excited and the emission spectrum analyzed and measured with a spectrometer. The wavelengths appearing in the plasma emission band indicate the nature and quantity of the impurities in the slag, enabling plant operators to adjust production parameters to achieve a desired product.

While the above discussion has centered on spectrometer devices using mirrors, and such devices are usually preferred because of the quality of imaging using mirrors, it is possible to construct devices using focusing lenses, such as convex lenses or compound multielement lenses having an overall convex optical characteristic. In principle, it is also possible to combine lenses and mirrors in an instrument.

It is also noted that diffraction gratings in spectrometers may be either classical mechanically ruled diffraction gratings of the type invented and made by applicant's assignee at the beginning of the 1800's, or holographic diffraction gratings of the type manufactured by applicant's assignee since the 1960's.

It is also known that spectrometers may be constructed using concave diffraction gratings, such as concave holographic diffraction gratings of the type invented by Flamand in the late 1960's working at the applicant company as illustrated by his U.S. Pat. No. 3,628,849.

A Littrow-mounted system is a relatively common method of utilizing large plane reflection gratings, providing simplicity and good optical quality arising from the use of a single nmirror to perform both collimating and focusing functions. Moreover, in this configuration, the collimating and focusing functions are both performed in the same geometric space, resulting in efficient use of that space. In a typical Littrow setup, a mirror delivers parallel incident light from an input point source to the grating, and focuses diffracted light received from the grating to an output point often proximate the input point source. In such devices, a single mirror acts as both collimator and focusing element at once, minimizing the number of optical elements required.

In addition to its simplicity, employing the Littrow configuration is particularly desirable for its high quality output. Because the input and output light beams traverse the same optical path, in opposite directions, optical aberrations in the collimating and focusing components are auto-corrected, or self compensating, so that image quality is diffraction limited, i.e. limited by the physical properties of the optical system not by the deficiencies of the optics.

Figure 1:
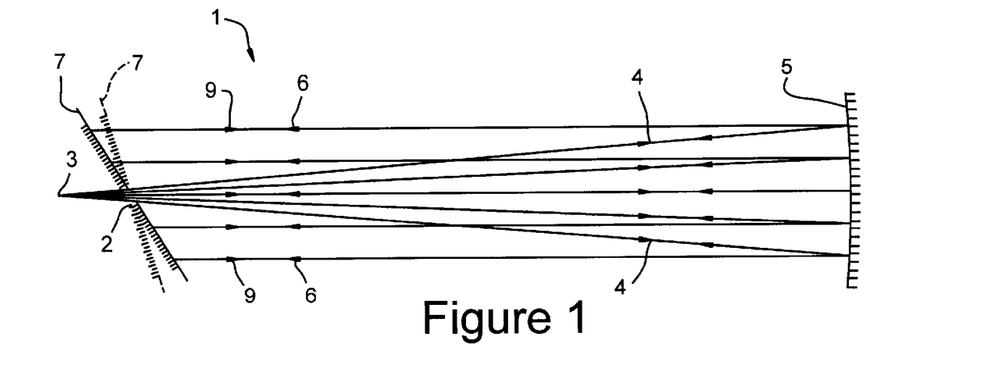
FIG. 1 is a diagrammatic side view of a conventional arrangement for a Littrow spectrometer.

Referring now to FIG. 1, one embodiment of a prior art, Littrow-mounted, plane grating spectrometer 1 is shown schematically. Spectrometer 1 employs a rotatably mounted diffraction grating 7 having an inlet aperture, or slit 2, providing a point or line light source and admits light from a source 3 in the direction of arrows 4 toward a concave focusing mirror 5. Light reflected from mirror 5 is focused to travel in a collimated beam in the direction of arrows 6 which then strikes diffraction grating 7.

When the collimated light 6 strikes grating 7 it is diffracted at an angle which varies as a function of wavelength. Accordingly, grating 7 is rotated to variably select one wavelength from a number of wavelengths, as desired, or to scan through the spectrum of available wavelengths. Thus, a selected wavelength of light 8 is reflected back, at the Littrow angle, to travel in a parallel beam in the direction of arrows 9, oppositely to the direction of arrows 6. The returned selected wavelength of light traveling in directions 9 strikes concave mirror 5 and is focused to aperture 2.

An image can then be formed on a detector placed at aperture 2, if desired, or otherwise recorded or processed and quantified, if desired. From a practical standpoint, placement of the detector at a point on a slit may be undesirable. Therefore, the detector may be slightly offset, and the system tuned to select the desired wavelength, or other desired wavelengths, by rotation of grating 7 to an angular position that results in the imaging of that wavelength on the detector. As described above, a high quality, diffraction-limited output can be obtained. The instrument-shown, can function as a monochromator, if desired.

A particular drawback of such conventional Littrow-mounted grating configurations is the difficulty and expense of providing grating 7 with a central optical opening 2. Another drawback is that undue stray light may be returned to aperture 2 by mirror 5. It would be desirable to provide a spectrometer or comparable optical system, which did not suffer from these drawbacks.

BRIEF SUMMARY OF THE INVENTION

The invention, as claimed, is intended to provide a remedy. It solves the problem of providing a Littrow-mounted grating spectrometer for diffracting a light sample and selecting out a particular wavelength or spectral band without need for an optical opening or aperture in the grating.

To solve this and other problems, the invention provides, in one aspect a spectrometer capable of outputting light in a selected spectral band from a sample light input, the spectrometer comprising:

a) a planar diffraction grating capable of receiving a collimated beam of the sample light, input along an incident path at an incident angle, and of diffracting the received incident light to provide a diffracted light output of the selected spectral band, along the incident path in the opposite direction to the incident light; and b) a planar mirror disposed to direct the incident beam to the planar grating and receive the diffracted light from the diffraction grating on a light path that is a reflected path with respect to the planar mirror;

wherein the planar mirror can communicate optically with a light sample source and a light output. Preferably, the geometry is such that the planar mirror directs the incident beam at the Littrow angle for the selected spectral band. Use of a planar mirror to provide two-way light communication with the grating enables a compact instrument to be realized by employing suitable input-output optics.

The input-output optics can comprise a concave mirror in optical communication with the planar mirror, the light sample source and the light output. Preferably, the concave mirror provides the collimated sample light beam to the planar mirror along a planar mirror incident path and receives the diffracted light output along the same planar mirror incident path.

In one particularly preferred embodiment, a light aperture, which serves for both the input and the output light, is provided in the form of an optical opening through the planar mirror.

The light aperture can both admit light from the sample source and provide an exit for the light output. With particular advantage, the light aperture is disposed for source light received into the spectrometer through the light aperture to be collimated by the concave mirror and for the diffracted light output to be focused by the concave mirror to the light aperture, providing a Littrow mounting. For convenience, the planar mirror and the concave mirror are assumed to be disposed on a horizontal optical axis, although, the optical instruments of the invention can of course have any desired spatial orientation.

In effect, with such an arrangement, the optically apertured planar mirror folds the Littrow-collimated input-output light beam enabling the grating to be disposed geometrically above or alongside the optical pathway between the planar mirror and the concave mirror. The planar grating can be disposed to be rotatable through an orientation perpendicular to the optical axis, and may thus have significant length, enhancing image intensity, without significantly increasing the length or other dimension of the instrument.

By providing the spectrometer's input and output through the optical aperture in the planar mirror and disposing the concave mirror with its focal point in the vicinity of the optical aperture, the divergent-convergent light paths to and from the concave mirror are effectively laterally contained between the two optical elements, further enhancing the compactness of the inventive spectrometer.

The invention furthermore provides a method of optically selecting a spectral band from a sample light received through a light aperture located in and surrounded by a planar mirror, the method comprising:

a) collimating divergent sample light received from the input aperture with a concave mirror;

b) reflecting the collimated sample light with the planar mirror to a diffraction grating at the Littrow angle for the spectral band;

c) reflecting the diffracted spectral band with the planar mirror to the concave mirror; and d) focusing the diffracted spectral band to the output aperture.

In another aspect, the invention provides a spectrometer for producing a diffracted light output in a selected wavelength range from a sample light input, the spectrometer comprising:

a) a light aperture providing an optical inlet to the spectrometer for sample light to travel on an input light path and an optical outlet for output light traveling on an output light path;

b) a concave mirror to collimate the input light from the light aperture along an optical axis and focus the output light to the light aperture, c) a planar mirror angled across the optical axis to reflect the input light received from the concave mirror to an optical processing unit for processing the input light to provide the output light, the input light and the output light traveling to the optical processing unit along the same path, in opposite directions.

In this aspect, the invention provides a compact aberration-corrected optical input-output unit or system which can be used with a variety of optical processing units that are operable with collimated input and output light traveling in opposite directions on the same path.

BRIEF DESCRIPTION OF THE SEVERAL VIEWS OF THE DRAWINGS

Some embodiments of the invention, and of making and using the invention, as well as the best mode contemplated of carrying out the invention, are described in detail below, by way of example, with reference to the accompanying drawings, in which like reference characters designate like elements throughout the several views, and in which.

DETAILED DESCRIPTION OF THE PREFERRED EMBODIMENTS

Figure 2:
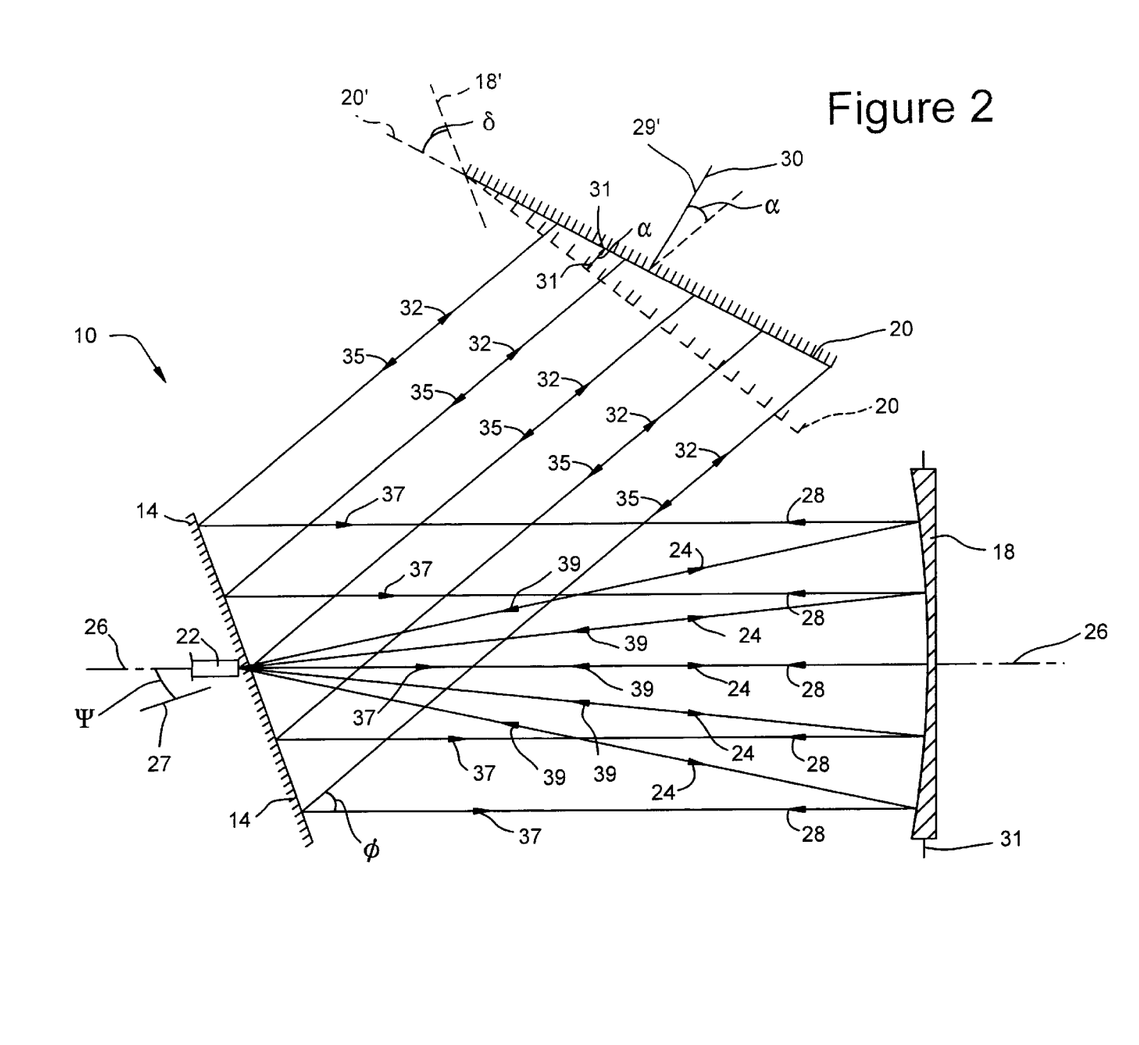
FIG. 2 is a diagrammatic view of a spectrometer according to the invention having a folded light path in a Littrow arrangement.

Referring now to the inventive spectrometer instrument illustrated in FIG. 2, spectrometer 10 includes a planar mirror 14 having a central, optical aperture 16, a concave, parabolic mirror 18 and a diffraction grating 20. Directional references herein will, for convenience, be made with respect to the orientation of spectrometer 10, as shown in FIG. 2 where planar mirror 14 is on the left, concave mirror 18 is on the right and diffraction grating 20 is disposed above and between mirrors 14 and 18 with its grating lines, or grooves, extending perpendicularly to the paper. It will be understood that, in practice, spectrometer 10 may have any desired orientation.

Simply stated, spectrometer 10 receives sample light through optical aperture 16, light incident on concave mirror 16 is collimated, reflected by planar mirror 14 to diffraction grating 20 where the incident beam is diffracted and a selected spectral segment is returned along the same optical path to exit through optical aperture 16.

The sample light may come from any suitable source, for example a lamp such as a mercury vapor lamp, a light emitting diode or the like, an incandescent sample, and may be provided to optical aperture in any suitable manner, including directly, via light pipe, lens, mirror, or other suitable light conduit. However, an optical fiber is preferred. The sample light will usually be a complex mixture of wavelengths, for example, such as are produced by hot body radiation, or particles or gases in a plasma, but in certain cases it is contemplated, that the invention may have use for calibrating, detecting or measuring substantially monochromatic light. Typical sample sources are industrial materials, such as the steel slag samples referenced above, raised to a sufficient temperature to emit characteristic elemental spectra. The inventive spectrometer is well suited to examination of such spectra. Other suitable sample sources are many, as will be apparent to those skilled in the art.

Accommodated within optical aperture 16, is a fiber optic bundle 22. Other light capture devices, besides fiber optic bundle 22 can be located to receive light reaching optical aperture 16 from mirror 18, if desired.

Preferably, optical aperture 16 is configured to conform closely to the dimensions of the end of fiber optic bundle 22, and to extend through planar mirror 16. However, it will be understood that the function of optical aperture 16 is to permit light from fiber optical bundle 22, or other optical input/output device to travel to or from concave mirror 18. To this end, optical aperture 16 may not necessarily physically penetrate mirror 18. For example, where mirror 14 has a reflective layer, or reflective member, and a transparent layer, such optical communication may be satisfactorily achieved with a structure where aperture 16 extends only through the reflective layer or member and not through the transparent covering.

Optical aperture 16 provides both an entrance path for light received into spectrometer 10 from a suitable source, for example an illuminated sample, and an exit path through which the instrument's output can be transmitted to a suitable optical viewing, processing or recording device. Light entering and exiting optical aperture 16 may travel to or from spectrometer 10 through one or more fibers each, of fiber optic bundle 22.

Concave mirror 18, juxtaposed to aperture 16, where the light entrance and exit paths to the system are located, effectively constitutes, in combination with aperture 16, a Littrow mounting. Thus, concave mirror 18 is arranged as a collimating-focusing mirror which collimates the input light sample and focuses the output light component returned by the system.

Input incident light diverges from a light source, such as optic fiber 22, passes through optical aperture 16 which, in this sense, functions as an input aperture. If necessary, optical aperture 16 may define the input light into a cone, or other divergent shape, suitable for collimation by concave mirror 18. However, in other cases fiber optic bundle 22 may output a satisfactory light cone not requiring further definition by optical aperture.16.

Output light is received back from planar mirror 14, after diffraction by grating 20, by concave mirror 18, and focuses the collimated reflected light onto fiber optic bundle 22, in optical aperture 16.

The three main optical components of spectrometer 10, planar mirror 14, concave mirror 18, and planar diffraction grating 20 are all held in relationship to each other on a suitable mounting (not shown), preferably within or comprising a housing (also not shown), in the positions illustrated in FIG. 2. Concave mirror 18 is aligned with planar mirror 14 on an optical axis 26 passing through optical aperture 16, both mirrors 14 and 18 preferably being centered on axis 26. Planar mirror 14 is oriented to axis 26 so that a line 27 normal to the plane of mirror 14 is at an angle ψ to axis 26.

Concave mirror 18 is essentially perpendicular to axis 26 with a tangent 29 to the center point of concave mirror 18, on axis 26, being perpendicular to axis 26. Planar diffraction grating 20 is rotatable or pivotable, about an axis 29 with a range of angular movement which includes the upper position shown in FIG. 2. The invention is not limited to this configuration, and other configurations will be apparent to those skilled in the art.

Optical elements 14, 18 and 20 have dimensions in the plane of the paper such as to provide a wide aperture, fast system. The dimensions transverse to the paper are smaller, as will be apparent from the examples given hereinafter, contributing to the compactness of the system. Optical elements 14, 18 and 20 are spaced as closely together as is feasible without impeding the optical performance of spectrometer 10, for example by physically interrupting a light path in the instrument, or by generating ghosts, or stray light reflections. Thus mirrors 14 and 18 are spaced apart so that their closest points to one another are separated by a small distance greater than the length of grating 20. The focal length of concave mirror 18 is chosen according to the spacing between mirrors 14 and 18 to focus at or near optical aperture 16. Grating 20 is spatially located to avoid significant pickup by concave mirror 18 of light diffracted from the righthand end of grating 20.

As shown, diffraction grating 20 is rotatable about an axis 29, indicated by arrows 31, to and from the position illustrated in solid lines in FIG. 2 to other positions, as indicated in broken lines, through an angle γ. Axis 29 extends along, or close to, a lefthand edge of grating 20, as viewed, perpendicularly to the paper, parallel to the grating lines on grating 20, and in the plane of the optical surface of grating 20. Grating 20 is preferably pivoted at either lefthand edge, as viewed in FIG. 2, but may also be pivotally mounted at a center point of the diffractive surface of grating 20. Alternatively, grating 20 may be rotatable about an axis 29', parallel to axis 29 spaced somewhat behind (i.e. above) grating 20. Other possible locations for a pivot axis for grating 20 will be apparent to those skilled in the art.

Rotating grating 20 about axis 29 (or 29') enables selection of a desired wavelength or narrow spectral segment of light to be returned back toward planar mirror 14 and, ultimately, focused onto fiber optic bundle 22, through optical aperture 16, by collimating-focusing mirror 18, for examination or recordal, or both, of the properties of the diffracted light.

As shown, angle α is the angle to the normal 30 at which light is incident upon grating 20, angle δ is the angle between mirror 14 and grating 20 as represented by the angle between plane 14' parallel to the optical surface of mirror 14 and plane 20' passing through the optical surface of grating 20, and angle γ indicates the angular range of movement of grating 20. Some exemplary values for angles α, δ and γ will be given hereinbelow.

Figure 3:
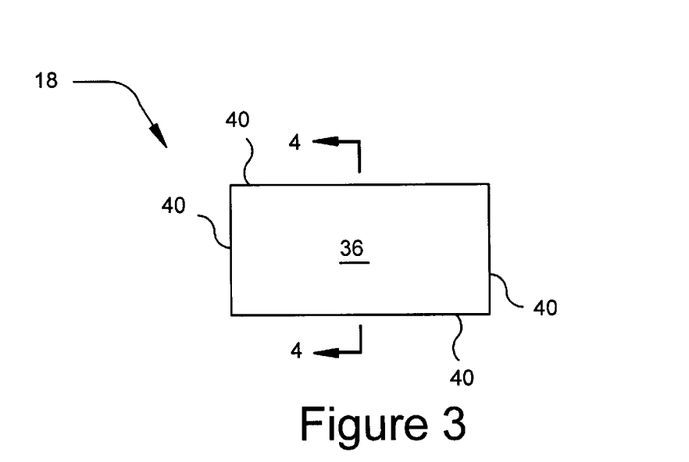
FIG. 3 is a front view of a parabolic mirror useful in the spectrometer shown in FIG. 2.
Figure 4:
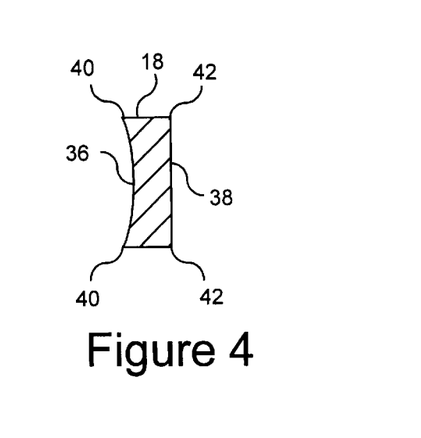
FIG. 4 is a cross sectional view taken along line 4—4 of FIG. 3.

Referring now to FIGS. 3 and 4, one preferred embodiment of concave mirror 18 has a length of 52 mm, a width of 27 mm transverse to the plane of the paper and a thickness of 8.5 mm. Preferably also, concave mirror 18 has a parabolic surface 36 and more preferably the parabolic surface has an eccentricity of 1.

Figure 5:
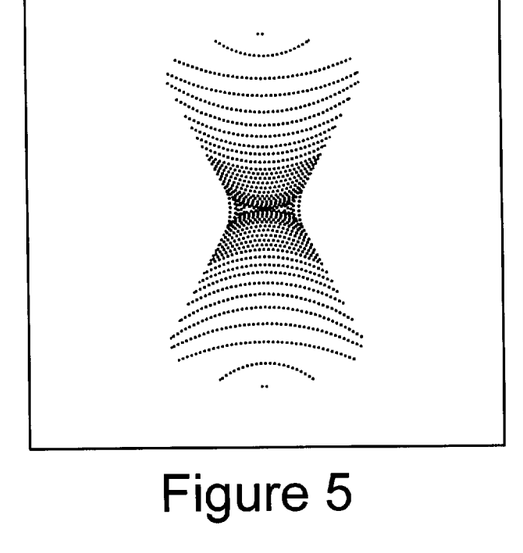
FIG. 5 is a simplified front view of a planar diffraction grating useful in the inventive spectrometer illustrated in FIG. 2.

Referring now to FIG. 5, a preferred embodiment of planar diffraction grating 20 is a holographic, blazed rectangular grating. Alternatively, a classically ruled grating may be employed, if desired, and the dimensions of either classical or holographic gratings preferred for use in the invention may vary. For example the length and width may each lie between about 15 mm and about 400 mm. Alternatively also, a circular grating having a diameter within similar size limits may be employed. The grating thickness can vary widely, for example, between about 3 mm and about 25 mm.

Grooves 48 in grating 20 are oriented perpendicular to axis 26 so that incident light is diffracted in patterns extending transversely to the paper. Preferably, the groove density is about 900 grooves per millimeter ("gr/mm" herein), but other groove densities may be employed, as is known in the art, depending upon the desired operating wavelength. Thus, preferred embodiments of grating may have groove densities between about 100 and about 6000 gr/mm.

Preferably also, grating 20 is blazed at an application-specific wavelength. Different blaze characteristics may be employed according to the desired wavelength to be selected, to provide enhanced efficiency at a desired wavelength. For example, classically ruled gratings can be blazed at wavelengths of from about 250 nm, in the ultraviolet, to about 5000 nm, in the infrared. Holographic gratings can be optimized with spectral bands lying between about 150 nm, in the low ultraviolet, to about 10,000 nm (10 micron), in the near infrared.

Suitable gratings are available from the assignee of this application, Jobin Yvon Inc. Edison, N.J. One such suitable grating for employment in the preferred embodiment of the invention illustrated in FIG. 2, is supplied by Jobin Yvon Inc. under catalog number 520 30 210. This grating has dimensions of 135 mm×165 mm×30 mm, has 600 grooves/mm and is optimized for 150–450 nm.

Depending upon the wavelengths to be sampled, the range of rotation of grating 20 about axis 29 may be such that angle α can vary from about 0° to about 60° to the grating normal, so that angle γ the angular range of movement of grating 20, is about 60°. However, for a given application, the ranges of variation of both angle α and angle γ, are preferably significantly less, for example about 30°, or even 20° or less. Thus, for example, in a preferred embodiment, angle α can vary from about 10° to about 21° to the grating normal, with grating 20 being movable between the position shown in full lines, and the position shown in broken lines, providing a wavelength range of from about 400 nm to about 800 nm. In this case, angle γ the angular range of movement of grating 20, is about 11° Other values for angles α and γ will be apparent to those skilled in the art, depending upon the desired application.

Suitable gratings for use in the practice of the invention, such as grating 20, can be manufactured by thin film casting from a master grating, using an organic film material. The cast film is bonded to an appropriate substrate and reflectorized. The master grating can be produced in a holographic process wherein the grating pattern is defined by means of interfering light patterns, produced from laser sources, which are projected on to a suitable hard substrate coated with photoresist film. After exposure, the pattern is etched into the substrate. Blazing, which entails shaping the grooves of the grating, is accomplished by means of a chemical etch, possibly followed by an ion etch to achieve a desired blaze shape.

Figure 6:
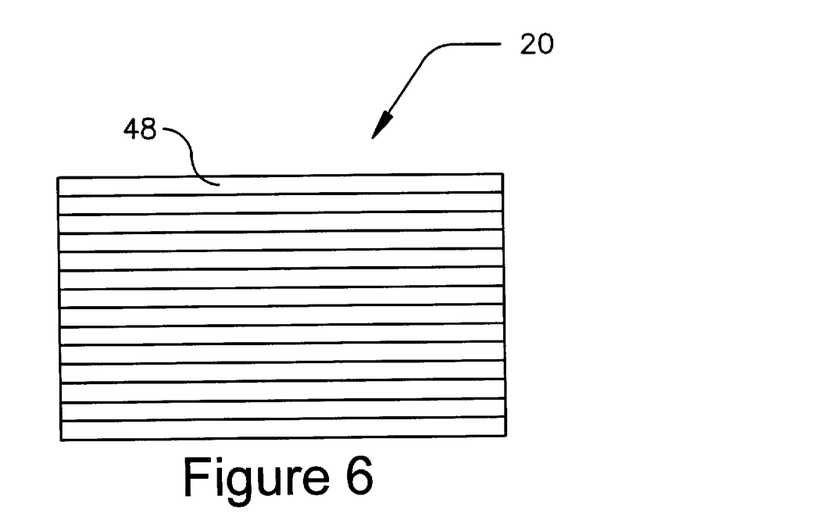
FIG. 6 is a front view of a preferred embodiment of planar mirror having a single optical input/output aperture for use in the inventive spectrometer illustrated in FIG. 2.

Referring now to FIG. 6, planar mirror 14 is preferably polished or otherwise leveled to a flatness within the range of about λ/8 to about λ/4, preferably λ/6, where λ is 632.8 nm. Preferred dimensions are a width transverse to the plane of the paper of 25 mm and a length of 50 mm. Planar mirror 14 is disposed at any suitable angle.

In the preferred embodiment of planar mirror 14 illustrated in FIG. 6, optical aperture 16 is circular with a diameter of 1.84 mm, and accommodates a terminal end of fiber optic bundle 22. Optical aperture 16 accommodates, or provides optical access to at least two optical fibers, an input fiber optic 44 which provides sample light and an output fiber optic 46 which receives the returned light from concave mirror 18 after it has been resolved by grating 20. In the preferred embodiment, input and output fiber optics 44 and 46 are each single fibers with a core diameter of about 9 μm, one preferred fiber being supplied by Corning Inc., under catalog number SMF 28.

While the preferred optical elements of spectrograph 10, namely mirrors 14 and 18 and grating 20, have been shown as having rectangular configurations, other suitable shapes may be utilized in practicing the invention, as will be apparent to those of ordinary skill in the art.

Figure 7:
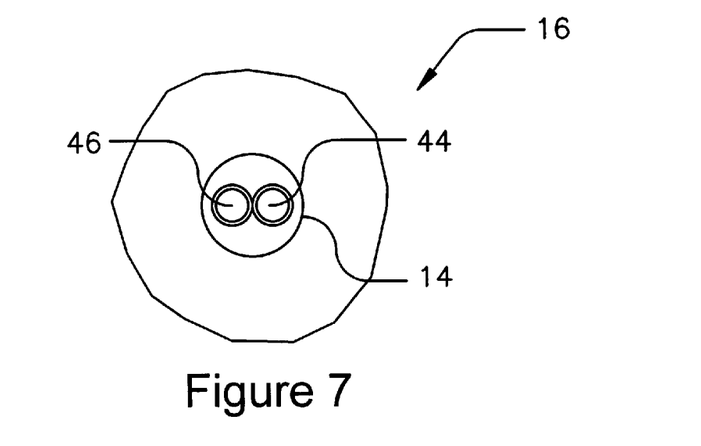
FIG. 7 is a front view of one alternative embodiment of the planar mirror shown in FIG. 6.
Figure 8:
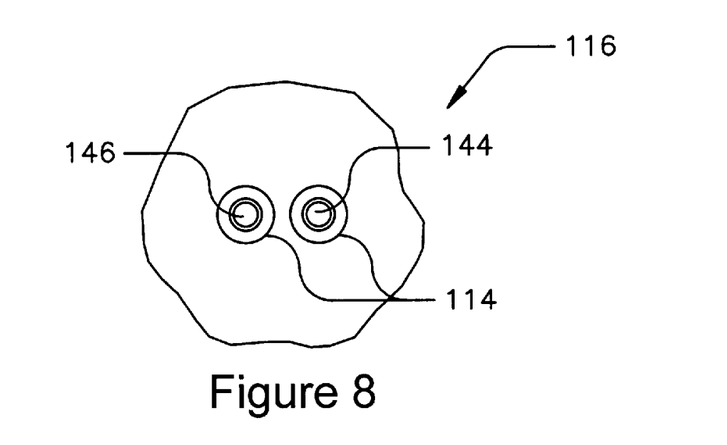
FIG. 8 is a front view of another alternative embodiment of the planar mirror shown in FIG. 6.

Alternative embodiments of optical aperture 16 and configurations of fiber optic bundle 22 in relation to planar mirror 14 are illustrated in FIGS. 7 and 8. Generally, similar parts or parts performing analogous, corresponding or identical functions to those of the FIG. 2 embodiment are numbered herein with numbers which differ from those of the earlier embodiment by multiples of one hundred.

In FIG. 7, two apertures 114, extend through the center of mirror 116. Each aperture 114 is circular and is sized to receive and closely conform to a respective one of two optical fibers, namely inlet light fiber optic 144 and an output fiber optic 146.

In FIG. 8, a single hour-glass shaped aperture 214 extends through the center of mirror 216. Aperture 214 and is sized to receive and closely conform to an inlet light fiber optic 244 and an output fiber 246.

Sample light from a suitable sample source, which may have a continuous or other diverse non-monochromatic spectral character, is input to spectrometer 10 through optical aperture 16 from fiber optic bundle 15. The sample travels on first incident light paths 24 which diverge from optical aperture 16 to concave mirror 18. Fiber optic bundle 15, in conjunction with optical aperture 16, preferably functions essentially as a point source. Sample light reflected from concave mirror 18 travels on a second incident light path 28 in a collimated bundle, parallel to axis 26, toward planar mirror 14. Angle ψ, the angle of orientation of planar mirror 14 to axis 26 significantly affects the overall geometry of the novel spectrometer and is preferably selected so that diffraction grating 20 can be spatially located between planar mirror 14 and concave mirror 18, although other possible configurations will be apparent to those skilled in the art. A preferred value for angle ψ is about 20° but angle ψ may vary between about 5° and about 40°, more preferably between about 15° and about 25°.

The sample light is then reflected from planar mirror 14 at an angle φ to incident light path 28 and travels along a third incident light path 32 in a collimated bundle toward diffraction grating 20. Angle φ is two times angle ψ. The sample light is diffracted by grating 20 in various directions depending upon the wavelength of the light, the groove spacing of grating 20 and the angular orientation of grating 20. A narrow wavelength slice or sample of the diffracted incident light is reflected back along substantially the path traveled by the incident sample light, but in the opposite direction thereto, to fiber optic bundle 22. For a given grating 20, the particular wavelength, range of wavelengths or spectral segment, of the diffracted light which is returned by optical system 10 to optical aperture 16, can be selected by suitable choice of angle α which determines the angular orientation of grating 20, The selected sample of light diffracted by grating 20 travels back toward planar mirror 14 on first return light path 35 in the opposite direction to that of third incident light path 32. At planar mirror 14 the returned light received from grating 20 is reflected back along second return light path 37, toward concave mirror 18, parallel to axis 26 and in the opposite direction to second incident light path 28. At concave mirror 18, the returned light spectral band received along second return light path 37 is reflected and focused to travel along third return light path 39 which converge on optical aperture 16 and fiber optic bundle 22. Mirror 18 functions as a focusing mirror for the returned light.

If desired, a motorized and optionally computer-controlled mounting can be provided for rotating diffraction grating 20 to automate the scanning of available wavelengths.

One advantageous difference between the novel spectrometer shown in FIG. 2 and the elongated conventional Littrow spectrometer shown in FIG. 1, is the employment, pursuant to the invention of a planar mirror, mirror 14, to fold the optical axis of the system. Another advantageous difference, is the introduction of sample light into the spectrograph, pursuant to the invention, at a central point of the light path system, which is to say, in the embodiment shown in FIG. 2, through optical aperture 16, between concave mirror 18 and grating 20. These features facilitate compact and modular design. In addition, the inventive system avoids the difficulty and expense of machining a grating with a hole, and stray light is reduced or avoided, as compared with conventional systems, because grating 20 is not on mirror axis 26.

In addition, the input and the output fibers can access the system through an opening in planar mirror 14, provision of which is a relatively simple structural expedient. Modification or customization of more sophisticated elements, such as concave mirror 18 or grating 20, although possible, can be avoided. Such adaptations of the more active optical elements are prone to be expensive or difficult to make without deleteriously affecting the optical performance of the system. However, it will be understood that included among the many possible modifications and variations that may be made to the preferred embodiments, pursuant to the invention, is the possibility that planar mirror 14 could be replaced by a large-radius concave mirror, also centrally apertured, the concavity providing modest focusing of the incident beam on grating 14, to enhance the light intensity at grating 20. Additionally, or alternatively, grating 20 could be concavely curved, also to a large radius, to help focus the return beam of diffracted light.

In another embodiment, a convex lens, or compound lens, can be used as an alternative to concave mirror 18 to collimate sample light and focus the output light. In such case, the light aperture, or optical opening 16 will not be located in mirror 14, but will be located on the opposite side of the collimating-focusing lens, in a screen or the like. It will be understood that such an embodiment of the invention lacks the compactness provided by use of concave mirror 18 but still benefits from the spatial economy provided by using planar mirror 14 to fold the optical path.

Concave mirror 18 acts as a focusing mirror and focuses the diffracted light into a point image at fiber optic bundle 22. Fiber optic bundle 22 may effectively occupy the whole of optical aperture 16, or only a portion thereof. While it is convenient for input and output fibers to be contained in one and the same fiber optic bundle 22, it will be understood that separate bundles or fibers may be used, and that separate optical entrance and exit apertures 16, juxtaposed one to the other, may also be provided, if desired, one embodiment of which is described in more detail in connection with FIGS. 6–8.

As known in the art, computer modeling or simulations employing software such, for example, as Sinclair Optics OSLO (trademark) version 5 or 6 software can be used to aid in system component design. The OSLO software can furthermore be used for statistical modeling to simulate optical performance of the system. To this end a RMS (root mean square) spot size can be estimated by tracing the path through the optical system of a number of exact rays emanating from one or more field points at the entrance to the system, and measuring the standard deviation of the positions at which the rays intersect the image surface at the exit to the system. An ideal system would provide a zero spot size.

Figure 9:
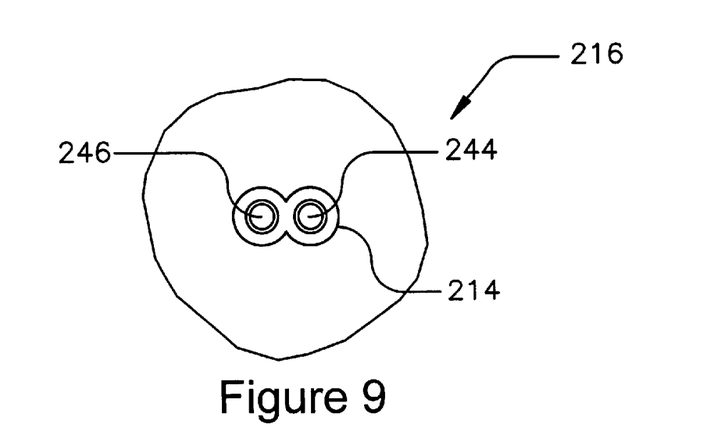
FIG. 9 is a computer generated image of a point source as viewed through the spectrometer of FIG. 2.

Such a scatter pattern employing the OSLO software to simulate the performance of system 10 is shown in FIG. 9. The pattern shown is indicative of an image created at, or just outside, aperture 16, by passage through spectrometer 10 of multiple divergent light rays originating from a point source, also at, or just outside, aperture 16, of wavelength 543 nm. The regular, fringe-like dot patterns are indicative of the range of statistical image variation resulting from diffraction by grating 20, while the dot intensity is indicative of the distribution, concentrated in the center of the scatter image. The geometrical root mean square spot size is computer-determined at $1.35 \times 10^{-4}$ mm, which is much smaller than the computer-determined diffraction limit of $4.73 \times 10^{-}$mm, indicating effective correction, or control, of optical aberrations, and that image quality is diffraction limited.

As described above, preferred embodiments of the invention can operate at a wavelength, or spectral band, in the range of from about 400 to about 1700 nm. However, other embodiments of the novel spectrometer described herein can be provided for use with light of any desired wavelength, or with radiation at other suitable wavelengths, by appropriate selection of the specifications of optical elements of the system, by appropriate modifications of the system geometry and by other appropriate design modifications, as will be apparent to those skilled in the art. The invention is particularly beneficial in this regard in not being limited by the optical transmissivity of glass or other transparent material, employing as the invention can, for light modulation purposes, reflective or refractive elements, notably gratings or mirrors. Such other embodiments can operate, for example, at selected narrower spectral bands within a broader wavelength range of from about 200 nm to about 2 micron, or even from about 10 nm to about 10 micron.

The inventive spectrometer can be contained within a light-tight housing which excludes as much stray light as practical from the housed optical elements. The housing should be robust and durable to protect the optics during use and should be sufficiently rigid to maintain a proper geometric relationship between the optical elements. The housing can be internally journaled to support grating 20 for rotation, and shaped to accommodate such rotation. Additionally the housing can have a suitable opening or openings for fiber optic bundle 22 and may be provided external with mounting structure such as threaded extensions, unthreaded bosses, recesses or apertured flanges for attachment to other modules or equipment.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. An optical instrument for diffracting light into a selected wavelength, said optical instrument comprising:
    a) a light entrance and light exit surrounded by a substantially ply reflective surface;
    b) a first incident light path emanating outwardly from the light entrance;
    c) a second incident light path being substantially parallel to a first incident light path axis;
    d) a collimating mirror transverse to said first incident light path axis to direct collimated light along the second incident light path, said substantially planar reflective surface being located in said second incident light path to direct collimated light along a third incident light path;
    e) a substantially planar diffraction grating to receive the collimated light traveling along the third incident light path and diffract light to travel back along said third incident light path;

wherein the diffracted light is redirected by said substantially planar reflective surface toward said collimating mirror along said second incident light path, said collimating mirror focusing the diffracted light back along said first incident light path to a light exit juxtaposed to said light entrance and wherein the diffraction grating is mounted for rotation to permit selection of the light output wavelength or spectral band.

2. An optical instrument according to claim 1, wherein light is supplied to said light entrance by an optical fiber.

3. An optical instrument according to claim 1, wherein said light entrance is centrally located within said planar reflective surface.

4. An optical instrument according to claim 1, wherein said light entrance is located at the focal point of said collimating mirror.

5. An optical instrument according to claim 1 wherein said reflective surface is polished to a flatness of from about $\lambda/8$ to about $\lambda/4$, where $\lambda=632.8$ nm.

6. An optical instrument according to claim 1, wherein said collimating mirror is parabolic in shape with an eccentricity of 1.

7. An optical instrument according to claim 1, wherein said collimating mirror has a focal length between about 50 mm and about 500 mm.

8. An optical instrument according to claim 7, wherein said collimating mirror has a focus of about 100 mm.

9. An optical instrument according to claim 1, wherein said diffraction grating has a groove density in the range of from about 100 to about 6000 groove per millimeter.

10. An optical instrument according to claim 1, wherein said substantially planar diffraction grating further has a groove density of about 900 grooves per millimeter.

11. An optical instrument according to claim 1 wherein the reflective surface is the front surface of a mirror.

12. An optical instrument according to claim 1 wherein the concave mirror, the light sample source and the light output comprise a Littrow mounting to introduce light to and receive light from the planar mirror.

13. An optical instrument for diffracting light into a selected wavelength, the optical instrument comprising:
    a) a collimating mirror to reflect light originating from a focal point of the collimating mirror into a collimated beam;
    b) a light inlet optical fiber located substantially at the focal point of the collimating mirror;
    c) a light outlet optical fiber also located substantially at the focal point of the collimating mirror;
    d) a substantially planar reflector angled across the collimated light beam and having a light aperture for receiving the light inlet optical fiber and the light outlet optical fiber, the substantially planar reflector at least partially surrounding the aperture;

e) a substantially planar diffraction grating positioned to receive collimated light reflected by the substantially planar reflector;

wherein the planar reflector can receive a selected wavelength of light diffracted by the planar diffraction grating and reflect the selected wavelength to the concave mirror to be reflected by the concave mirror to the outlet optical fiber and wherein the diffraction grating is mounted for rotation to permit selection of the light output wavelength or spectral band.

14. An optical instrument according to claim 13, wherein the collimating mirror is parabolic in shape, and has a focal length between about 50 mm and 500 mm.

15. An optical instrument according to claim 13, wherein the planar grating is mounted for rotation to vary the selected wavelength returned to the outlet.

16. An optical instrument according to claim 13, wherein the planar grating is rectangular, having a length and a width each between about 15 and about 400 mm, or is circular, having a diameter between about 15 and about400 mm, has a thickness between about 3 and about 25 mm and has a groove density between about 100 and about 6000 gr/mm.

17. A method of optically selecting a spectral band from a sample light received through a light aperture located in and surrounded by a planar mirror, the method comprising;
   a) collimating divergent sample light received from the input aperture with a concave mirror;
   b) reflecting the collimated sample light with the planar mirror to a diffraction grating at the Littrow angle for the spectral band;
   c) reflecting the diffracted spectral band with the planar mirror to the concave mirror;
   d) focusing the diffracted spectral band to the light aperture; and
   e) rotating the diffraction grating to select the light output wavelength or spectral band.

18. A method according to claim 17 comprising detecting the wavelength-related intensity of the diffracted spectral band received through the light aperture.

19. A spectrometer providing a light output in a selected wavelength or spectral band from a sample light input, the spectrometer comprising:
   a) a planar diffraction grating to receive a collimated beam of sample light from the sample light input on a grating incident path at an incident angle and of diffracting the incident light to provide a diffracted light output in the selected wavelength or spectral band along the incident path in the opposite direction to the incident light the diffraction grating being mounted for rotation to permit selection of the light output wavelength or spectral band; and
   b) a planar mirror disposed to provide the collimated light beam to the diffraction grating on the grating incident path, to receive the diffracted light from the diffraction grating also on the grating incident path,
   c) a concave mirror to provide the collimated light beam to the planar mirror along a planar mirror incident path and receive the diffracted light output along the same planar mirror incident path wherein the planar mirror can reflect the collimated light beam from the concave mirror on the planar mirror to the diffraction grating on the diffraction grating incident path and can reflect the diffracted light output received on the grating incident path to the concave mirror on the planar mirror incident path;
   d) a light input aperture, comprising an optical input opening through the planar mirror, to receive into the spectrometer light from the sample source and provide the sample light to the concave mirror for collimation; and
   e) a light output aperture, also comprising an optical output opening through the planar mirror, to receive the diffracted light output from the concave mirror and output the diffracted light output from the spectrometer, wherein the concave mirror focuses the diffracted light output to the light output aperture.

20. A spectrometer according to claim 19 wherein the light input and output openings are coincident.

21. A spectrometer according to claim 19 wherein the light input and output openings are side-by-side.

22. A spectrometer according to claim 19 wherein the optical opening is disposed approximately centrally in the planar mirror.

23. A spectrometer according to claim 19 comprising a fiber optic bundle disposed at the light aperture.

24. A spectrometer according to claim 19 comprising a motorized computer-controlled mounting for rotating the diffraction grating.

25. A spectrometer according to claim 23 wherein the diffraction grating is mounted for rotation to vary the angle of incidence to the grating normal between about 0° and about 60°.

26. A spectrometer according to claim 19 operable at wavelengths in a range of from about 400 nm to about 1700 nm.

27. A spectrometer according to claim 19 operable in a spectral band having limits lying between about 200 nm and about 2 micron, optionally between about 10 nm and about 10 micron.

28. A spectrometer according to claim 19 having an optical axis along the planar mirror incident path being the optical axis of the concave mirror wherein the grating is oriented with the grooves of the grating perpendicular to the optical axis.

29. A spectrometer according to claim 19 wherein the grating is an optimized holographic grating.

30. A spectrometer according to claim 19 wherein the grating has a groove density of about 900 grooves per mm, and is optimized at about 900 nm.

31. An optical instrument according to claim 19 wherein the planar mirror and the planar grating are relatively disposed so that light is introduced to the planar grating at the Littrow angle for a desired wavelength of the diffracted light.

* * * * *